United States Patent
Waanders

(10) Patent No.: US 6,821,046 B1
(45) Date of Patent: Nov. 23, 2004

(54) ASSEMBLY FOR SUPPORTING AN OBJECT

(75) Inventor: Hermanus Johannes Waanders, Haaksbergen (NL)

(73) Assignee: Thales Nederland B.V., Hengelo (NL)

( * ) Notice: Subject to any disclaimer, the term of this patent is extended or adjusted under 35 U.S.C. 154(b) by 0 days.

(21) Appl. No.: 10/070,818

(22) PCT Filed: Sep. 1, 2000

(86) PCT No.: PCT/EP00/08612

§ 371 (c)(1),
(2), (4) Date: May 29, 2002

(87) PCT Pub. No.: WO01/20220

PCT Pub. Date: Mar. 22, 2001

(30) Foreign Application Priority Data

Sep. 10, 1999 (NL) .......................................... 1013018

(51) Int. Cl.⁷ .............................................. F16M 11/02
(52) U.S. Cl. ............................ 403/14; 403/90; 403/11; 33/299; 248/177
(58) Field of Search ........................... 29/525; 248/165, 248/158, 177; 403/11, 13, 90, 388, 389, 14, 128; 33/299

(56) References Cited

U.S. PATENT DOCUMENTS

| 4,290,574 A | | 9/1981 | Archibald |
| 5,416,969 A | * | 5/1995 | Miura |
| 5,505,422 A | | 4/1996 | Elterman |
| 5,568,993 A | * | 10/1996 | Potzick ........................ 403/90 |
| 5,692,728 A | | 12/1997 | Shiozawa |

FOREIGN PATENT DOCUMENTS

EP        0 051 574         5/1982

* cited by examiner

Primary Examiner—Daniel P. Stodola
Assistant Examiner—Victor MacArthur
(74) Attorney, Agent, or Firm—Oblon, Spivak, McClelland, Maier & Neustadt, P.C.

(57) ABSTRACT

Assembly for the defined support of a first object (6) on a second object (1), such as a director-mounted sight. In the top face of the director three pairs of steel balls (2a, 2b, 3a, 3b, 4a, 4b) are fitted, positioned in a triangle. In a sole plate of the sight three steel balls (7, 8, 9) are fitted, positioned in an identical triangle. The three balls rest on the three ball pairs. The sight is then fastened using, for instance, a screw, a spring or a magnet.

15 Claims, 3 Drawing Sheets

ASSEMBLY FOR SUPPORTING AN OBJECT

BACKGROUND OF THE INVENTION

1. Field of the Invention

Figure 1:
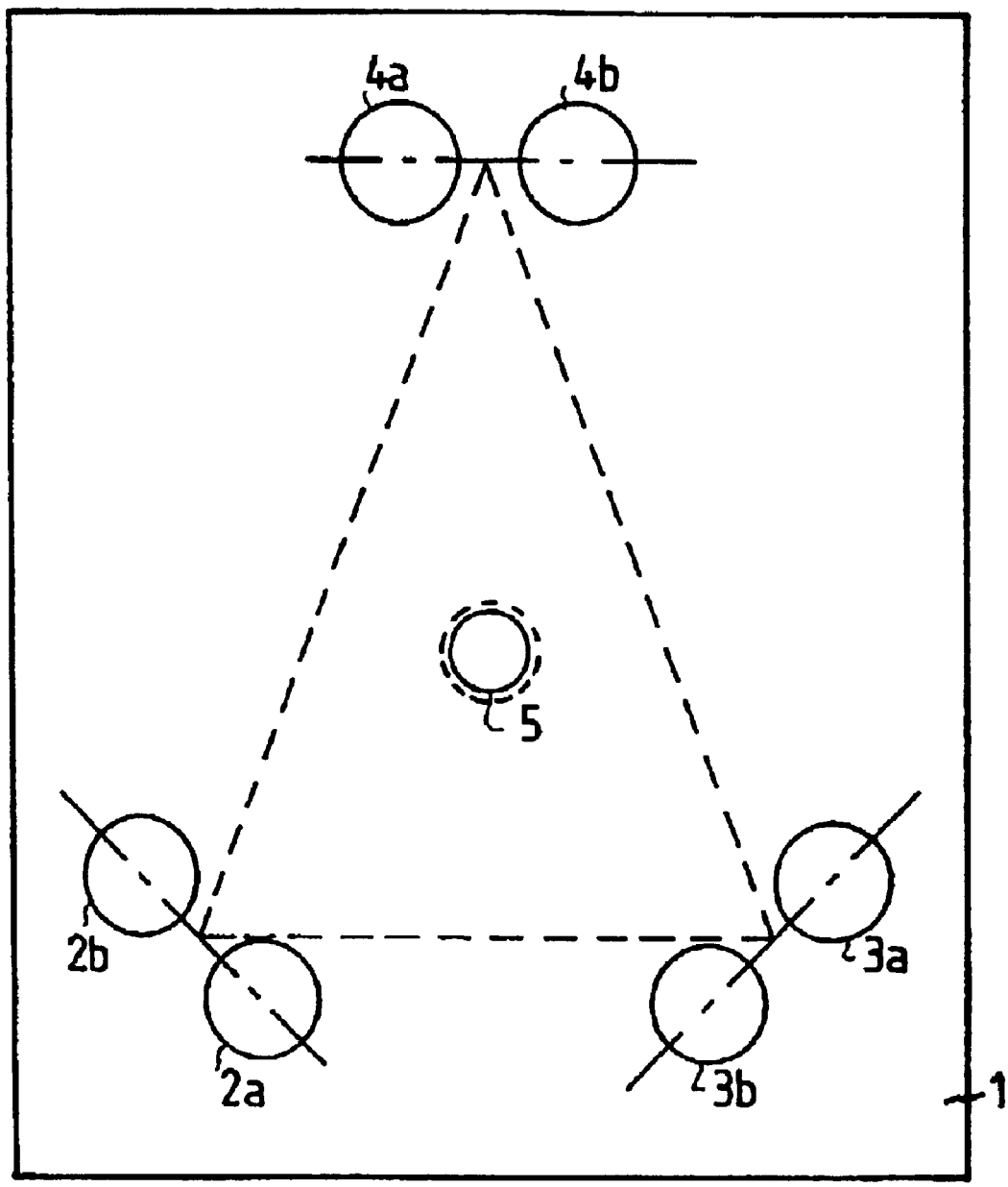

The present invention relates to an assembly, comprising a first object and a second object, and means for the defined support of the first object on the second objection, the means including three individual protrusions.

2. Discussion of Background

Assemblies of this type are known in the technical field, the protrusions usually being indicated as legs. The known support assemblies provide a satisfactory hold on a horizontal, smooth base. A direction of the first object relative to the second object is thereby indeterminate.

The present invention in a very simple manner enables determining also the direction of the first object relative to the second object, and is characterized in that the individual protrusions are provided with at least virtually sphere-segment shaped extremities, that the means also include three pairs of protrusions, combining with the individual protrusions, which are likewise provided with at least virtually sphere-segment shaped extremities, and that in an operational condition each individual protrusion of the one object contacts a corresponding pair of protrusions of the other object. After placing, the position of the first object relative to the second object is completely determined. An additional advantage is that the assembly is virtually unsusceptible to pollution and that any pollution can be removed very simply. It is moreover true that the assembly can be fitted in a simple manner, without the surfaces of the first object or the second object requiring a pre-treatment.

A preferred and conceptually logical embodiment of the invention is characterized in that the first object is provided with three protrusions, the centres of their sphere-segment shaped extremities defining a first triangle, that the second object is provided with three pairs of protrusions, the three pairs defining a second triangle which at least virtually corresponds with the first triangle, and that in an operational condition each individual protrusion of the first object rests on the corresponding pair of protrusions of the second object.

A preferred embodiment of the assembly, ensuring optimal stability, is characterized in that a connecting line between two centres of the sphere-segment shaped extremities of a pair runs at least substantially perpendicularly to a bisector of the angle of the second triangle where the pair is positioned. If conditions permit, the stability may be further enhanced by selecting for the second triangle one which is at least virtually equilateral.

A further preferred embodiment enabling simple dimensioning is characterized in that for the three pairs the midpoints of the three connecting lines between the two centres of the sphere-segment shaped extremities define a third triangle, and that this third triangle is at least virtually similar to the first triangle.

A specially preferred embodiment according to an aspect of the invention is characterized in that the protrusions are formed by metal balls, which are partially incorporated in the first object or in the second object. Metal balls, and particularly steel ones, combine great accuracy with exceptional hardness, which renders them extremely suitable for this application. They may moreover be fitted simply in the first object or the second object, by drilling a hole in it with a slight undersize, and pressing the ball home into the hole.

A further preferred embodiment is characterized in that all metal balls have a virtually equal diameter.

The inventive assembly discussed so far does not preclude, for instance, that an accurately positioned first object is lifted from the second object in a single movement or drops off it due to shocks or vibrations. A preferred embodiment that eliminates this potential drawback is characterized in that means are provided for the mutual fastening of the combined objects. The means then preferably include a screwed connection, a spring or a magnet.

The invention also relates to an object furnished with individual protrusions and/or pairs of protrusions, suitable for application in an assembly according to the invention.

The invention relates besides to a method for the reproducible supporting of a first object on a second object, three holes being made in the first object, in which subsequently are fitted three metal balls or objects with a ball-shaped extremity, the centres of the balls or ball-shaped extremities defining a first triangle. The inventive method is characterized in that in the second object three pairs of holes are made, in which subsequently are fitted three pairs of metal balls or objects with a ball-shaped extremity, the three pairs defining a second triangle which is at least virtually similar to the first triangle, the three balls or ball-shaped extremities of the first object then being placed on the three pairs of balls or ball-shaped extremities of the second object.

BRIEF DESCRIPTION OF THE DRAWING FIGURES

Figure 2:
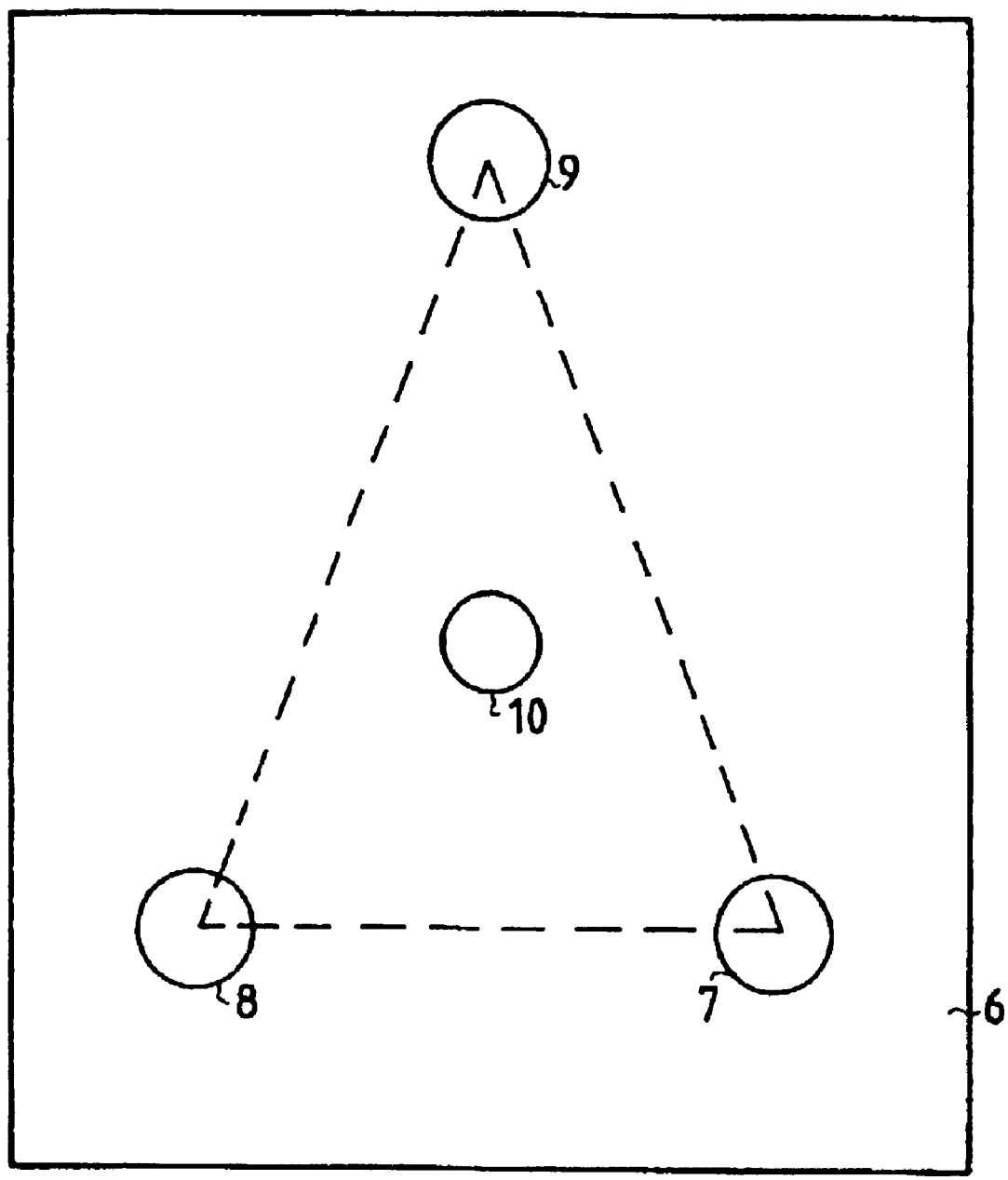
Figure 3A:
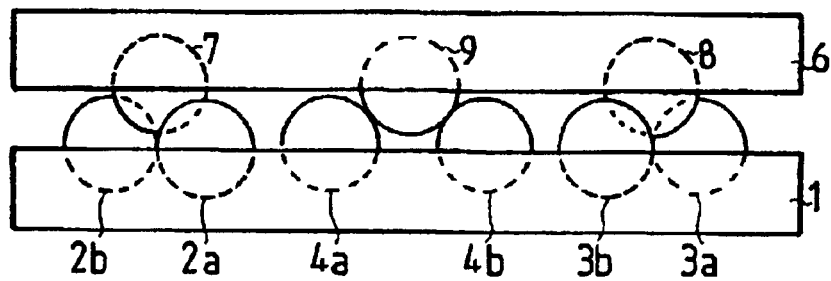
Figure 3B:
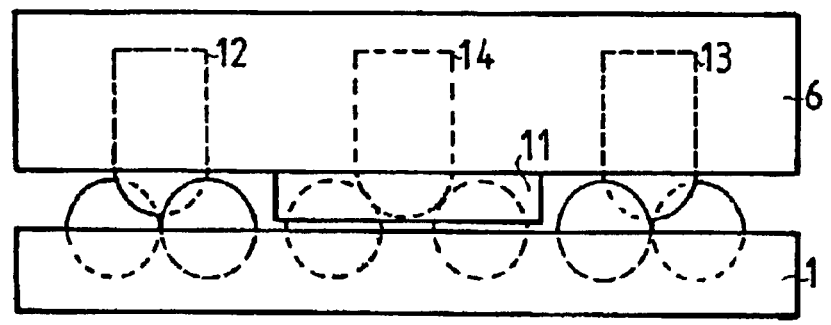
Figure 3C:
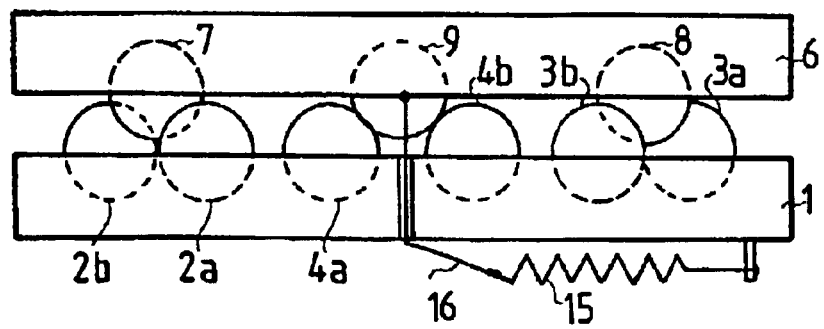

The invention will now be explained in detail with reference to the following Figures, where:

FIG. 1 schematically represents a part of a second object, provided with three pairs of steel balls;

FIG. 2 schematically represents a sole of a first object, provided with three steel balls;

FIG. 3A schematically represents a side elevation of the first object positioned on the second object;

FIG. 3B schematically represents a fastening using a magnet;

FIG. 3C schematically represents a fastening using a spring.

DETAILED DESCRIPTION OF THE PREFERRED EMBODIMENTS

FIG. 1 schematically represents a second object 1, provided with three pairs of steel balls 2a,2b, 3a,3b, 4a,4b, on which a first object (not yet shown in the Figure) can be supported. For the attachment of the balls, holes have previously been drilled into second object 1, in which the balls have subsequently been pressed or glued or otherwise fitted. For a stable support, an accurate positioning of the balls is not essential. Usually, however, it will be deemed desirable to accurately determine the position of the first object relative to the second object. In that case, it is important for the balls to be placed accurately in a previously determined pattern. An added advantage is that it is generally unnecessary for the second object to be previously planed or be subjected to some other pre-treatment. It is sufficient, for instance, to drill the holes using a numerically controlled drilling machine.

Centrally among the pairs of balls, a provision may be fitted for fastening a first object once it has been placed, the provision in this case being in the shape of a hole 5, provided with an inside thread.

FIG. 2 schematically represents an underside of a first object 6, provided with three steel balls 7, 8, 9, with which first object 6 can be supported on second object 1, and more particularly on the three pairs of steel balls 2a,2b, 3a,3b, 4a,4b. Centrally among the balls a hole 10 has been made, through which a bolt (not shown) can be inserted and subsequently screwed into hole 5, to fasten the first object. The bolt prevents the first object from dropping from the second object; the actual position, on the other hand, is totally determined by ball 7 resting between balls 2a,2b, ball 8 resting between balls 3a,3b and ball 9 resting between balls 4a,4b.

In FIG. 1 and FIG. 2 the positions of the ball pairs 2a,2b, 3a,3b, 4a,4b and of balls 7, 8, 9 are indicated as vertices of two triangles which are, at least if the first object is viewed from above, identical. The latter proves to be non-essential. A stable and accurate support can also be obtained if both triangles differ somewhat and are, for instance, only similar. Likewise a rotation of the pairs of balls in the plane of the drawing has no discernible effect and provides practically always a stable and accurate support. Neither is it necessary for the ball diameters to be equal.

It is, of course, also possible to provide the first object with two individual balls and a single pair of balls, and the second object with two pairs of balls and a single individual ball, such that in an operational condition each individual ball again corresponds with a pair of balls.

FIG. 3A schematically represents in side elevation the first object 6, as it rests on the second object 1, ball 7 fitting between balls 2a,2b, ball 8 between balls 3a,3b and ball 9 between balls 4a,4b.

FIG. 3B schematically represents in cross-section a fastening using a magnet 11, glued on first object 6. For a proper working it is necessary for second object 1 to be made of a ferromagnetic material, or alternatively be provided at its surface opposite magnet 11 with a plate of a ferromagnetic material or a second magnet. In FIG. 3B, in first object 6 no balls 7, 8, 9 are used, but pins 12, 13, 14, each having one flat end and one sphere-segment shaped end, the rounded extremities in the depicted operational condition combining with the ball pairs 2a,2b, 3a,3b, 4a,4b of the second object 1.

FIG. 3C schematically represents a fastening using a spring 15, one of whose ends is fitted to the second object 1, which is attached to the first object 6 with a steel or synthetic band 16.

What is claimed is:

1. An assembly comprising:
    a first object and a second object; and
    support means for supporting the first object above the second object, the support means including first, second and third protrusions protruding from the first object and first, second and third pairs of protrusions tightly fitted in first, second and third pairs of holes formed on a surface of the second object, respectively and partially protruding from the surface of the second object,
    wherein each protrusion of the first, second and third protrusions of the first object and each protrusion of the first, second and third pairs of protrusions of the second object have a substantially spherically-shaped extremity and when the first and second objects are in an operational position so that the first object is above the second object, the first protrusion of the first object contacts both protrusions of the first pair of protrusions of the second object, the second protrusion of the first object contacts both protrusions of the second pair of protrusions of the second object and the third protrusion of the first object contacts both protrusions of the third pair of protrusions of the second object.

2. The assembly according to claim 1, wherein the substantially spherically-shaped extremity of each of the first, second and third protrusions of the first object has a center and together the centers of the substantially spherically-shaped extremities of the first, second and third protrusions of the first object define vertices of a first triangle.

3. The assembly according to claim 2, wherein the substantially spherically-shaped extremity of each protrusion of the first, second and third pairs of protrusions of the second object has a center such that midpoints of connecting lines between the centers of the substantially spherically-shaped extremities of each pair of protrusions of the first, second and third pairs of protrusions define vertices of a second triangle, the second triangle being substantially identical to the first triangle defined by the centers of the substantially spherically-shaped extremities of the first, second and third protrusions of the first object.

4. The assembly according to claim 1, wherein each protrusion of the first, second and third protrusions of the first object and each protrusion of the first, second and third pairs of protrusions of the second object are formed by metal balls.

5. The assembly according to claim 4, wherein the metal balls have substantially equal diameters.

6. The assembly according to claim 1, further comprising fastening means for mutually fastening the first and second objects in the operational position thereof.

7. The assembly according to claim 6, wherein the fastening means include any one of a screwed connection, a spring, and a magnet.

8. A method for supporting a first object on a second object comprising:
    making first, second and third indentations in the first object;
    subsequently fitting first, second and third metal balls each having a substantially ball-shaped extremity into the first, second and third indentations, respectively, made in the first object, wherein a center of each of the first, second and third metal balls of the first object defines a vertex of a first triangle;
    making first, second and third pairs of indentations in the second object;
    subsequently fitting a substantially ball-shaped extremity of each of the first, second and third pairs of metal balls into the first, second and third pairs of indentations, respectively, made in the second object such that the first, second and third pairs of metal balls are tightly fitted in the respective pairs of indentations and partially protrude from a surface of the second object, wherein the substantially ball-shaped extremity of each metal ball of the first, second and third pairs of the metal balls has a center and midpoints between connecting lines connecting the centers of each pair of the metal balls of the first, second and third pairs of the metal balls define vertices of a second triangle which is substantially identical to the first triangle; and
    placing the substantially ball-shaped extremity of each of the first, second and third metal balls of the first object into supporting contact on the substantially ball-shaped extremities of the first, second and third pairs of the metal balls, respectively, of the second object,
    wherein the first metal ball of the first object contacts both of the first pair of the metal balls of the second object, the second metal ball of the first object contacts both of the second pair of the metal balls of the second object and the third metal ball of the first object contacts both of the third pair of the metal balls of the second object.

9. An assembly comprising:

a first plate supported above a second plate; and a supporting device configured to support the first plate above the second plate, the supporting device including first, second and third protrusions protruding from the first plate and first, second and third pairs of protrusions tightly fitted in first, second and third pairs of holes formed on a surface of the second plate, respectively and partially protruding from the surface of the second plate, wherein each protrusion of the first, second and third protrusions of the first plate and each protrusion of the first, second and third pairs of protrusions of the second plate have a substantially spherically-shaped extremity, and when the first and second plates are in an operational position so that the first plate is above the second plate, the first protrusion of the first plate contacts both protrusions of the first pair of protrusions of the second plate, the second protrusion of the first plate contacts both protrusions of the second pair of protrusions of the second plate and the third protrusion of the first plate contacts both protrusions of the third pair of protrusions of the second plate.

10. The assembly according to claim 9, wherein the substantially spherically-shaped extremity of each of the first, second and third protrusions of the first plate has a center and together the centers of the substantially spherically-shaped extremities of the first, second and third protrusions of the first plate define vertices of a first triangle.

11. The assembly according to claim 10, wherein the substantially spherically-shaped extremity of each protrusion of the first, second and third pairs of protrusions of the second plate has a center such that midpoints of connecting lines between the centers of the substantially spherically-shaped extremities of each pair of protrusions of the first, second and third pairs of protrusions define vertices of a second triangle, the second triangle being substantially identical to the first triangle defined by the centers of the substantially spherically-shaped extremities of the first, second and third protrusions of the first plate.

12. The assembly according to claim 9, wherein each protrusion of the first, second and third protrusions of the first plate and each protrusion of the first, second and third pairs of protrusions of the second plate are formed by metal balls.

13. The assembly according to claim 12, wherein the metal balls have substantially equal diameters.

14. The assembly according to claim 9, further comprising a fastening device configured to mutually fasten the first and second plates in the operational position thereof.

15. The assembly according to claim 14, wherein the fastening device includes any one of a screwed connection, a spring, and a magnet.

* * * * *